July 25, 1939.  R. C. COSGROVE  2,167,447

REFRIGERATION APPARATUS AND METHOD

Filed Sept. 18, 1937  2 Sheets-Sheet 1

INVENTOR
RAYMOND C. COSGROVE
BY
ATTORNEY

July 25, 1939.  R. C. COSGROVE  2,167,447
REFRIGERATION APPARATUS AND METHOD
Filed Sept. 18, 1937   2 Sheets—Sheet 2
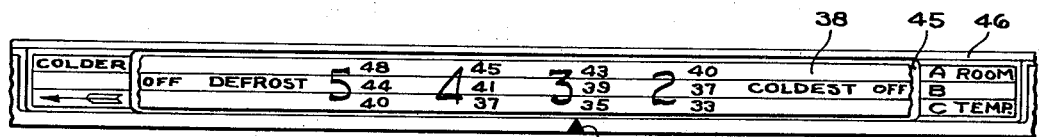
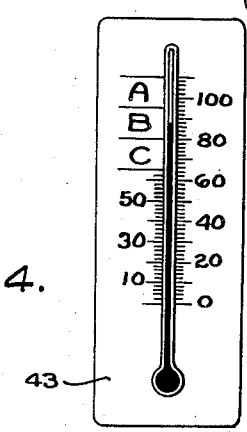
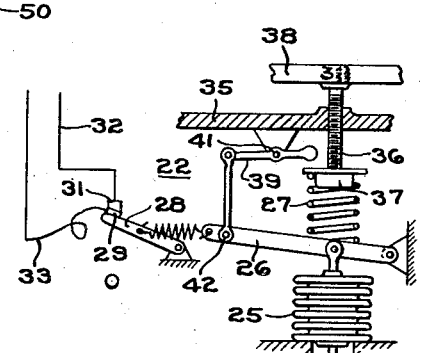
FIG. 3.
FIG. 4.
FIG. 5.
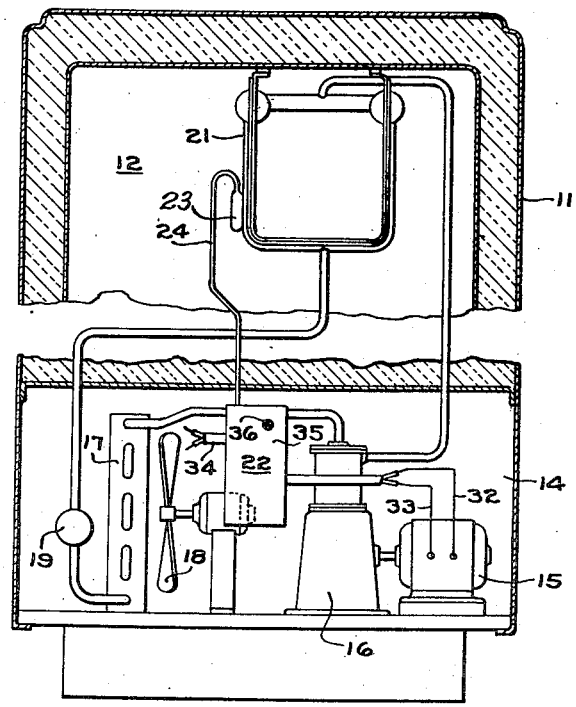
FIG. 6.
WITNESSES:
INVENTOR
RAYMOND C. COSGROVE
BY
ATTORNEY Patented July 25, 1939

2,167,447

UNITED STATES PATENT OFFICE 2,167,447

REFRIGERATION APPARATUS AND METHOD

Raymond C. Cosgrove, Mansfield, Ohio, assignor to Westinghouse Electric & Manufacturing Company, East Pittsburgh, Pa., a corporation of Pennsylvania Application September 18, 1937, Serial No. 164,435

5 Claims. (Cl. 62—1)

My invention relates to refrigeration apparatus and to a method of controlling the operation thereof.

Heretofore, refrigeration apparatus embodying a heat insulated storage compartment and a mechanical refrigeration system for abstracting heat from the storage compartment has been provided with a control device which effects operation of the refrigeration system in response to a temperature condition existing in the storage compartment. The control device is usually variable by the user or operator of the refrigeration system so that different temperatures of the cooling element may be obtained for various requirements. It is necessary in most cases to adjust the control when the temperature of the ambient media changes and the heat leakage into the insulated storage compartment varies. Since it is desirable that the control device respond to cooling element temperatures to some extent, so that ice and desserts may be quickly frozen therein, it is obvious that the control device does not consistently reflect the temperature conditions in all parts of the storage compartment because of the variations in heat leakage through the walls and the resistance to the flow of heat through the air in the storage compartment to the cooling element.

For example, for any given control setting, the mean storage compartment air temperature at a given point therein may be 40° F. in a 70° F. room, but may be 50° F. in a 110° F. room. When the room temperature rises, such as in the summertime, the operator heretofore usually set the control device to a lower temperature position, in ignorance of what temperatures had prevailed in the storage compartment and what temperatures would now prevail therein, the temperature settings being mainly guess-work. A thermometer was at times placed in the food storage compartment and various control adjustments made until the desired food storage compartment temperature was obtained, but such procedure took considerable time and effort and was seldom practiced by users of domestic refrigerators.

It is an object of my invention, therefore, to provide a quick, foolproof method by which the desired refrigerating temperature of the food storage compartment may be obtained, taking into account the ambient temperature then existing.

It is another object of my invention to arrange the indicia of an ambient temperature indicating device and the indicia associated with the adjustable device of the control mechanism of a refrigerating system so that the operator may readily obtain the mean temperature desired for the food storage compartment.

It is a further object of my invention to provide novel and useful refrigeration apparatus and a unique method of operation of such apparatus which will enable the user thereof to know positively, at all times, the temperatures prevailing in the storage compartment, and which will enable the user, without guess-work, to obtain any desired refrigerating temperature in the storage compartment within the capacity of the machine and in the range of the control device.

These and other objects are effected by my invention as will be apparent fom the following description and claims taken in connection with the accompanying drawings forming a part of this application, in which:

Fig. 3 is a developed view of the temperature adjusting device and a portion of the cabinet and illustrates the markings or indicia associated therewith which are utilized in using my invention;

Fig. 4 is an enlarged view of the temperature indicating device of Fig. 1 provided with indicia correlated with the indicia associated with the temperature adjusting device;

Fig. 5 is a diagrammatic illustration of a temperature control mechanism which is used as an example of a control mechanism for a motor driven compression type of refrigeration system; and, Fig. 6 is a diagrammatic view of a refrigerating system disposed in a refrigerator cabinet of the domestic type to which, by way of example, my invention is applied.

Figure 1:
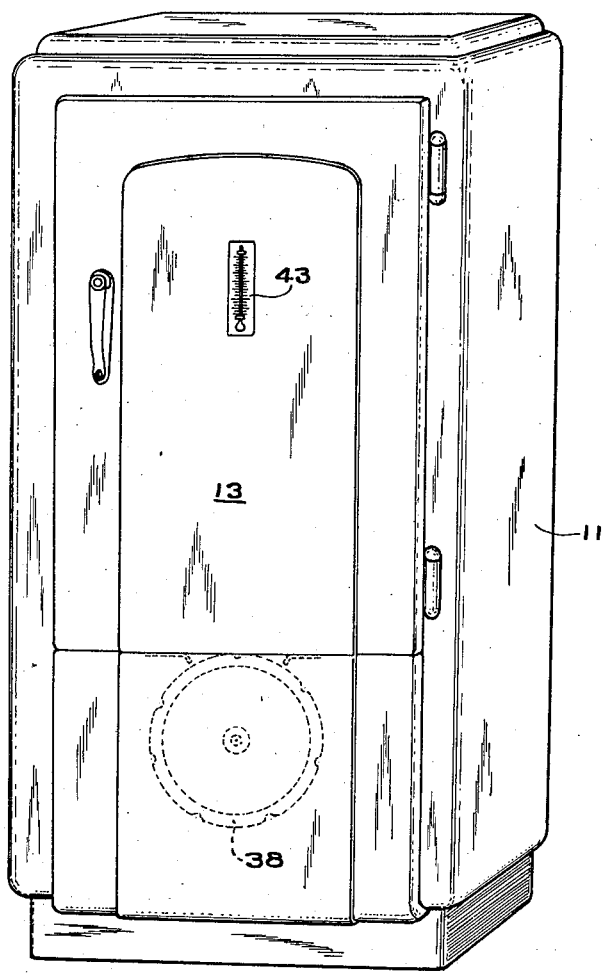
Fig. 1 is a perspective view of a domestic refrigerator cabinet provided with an ambient temperature indicator and a control adjusting device arranged in accordance with my invention.
Figure 2:
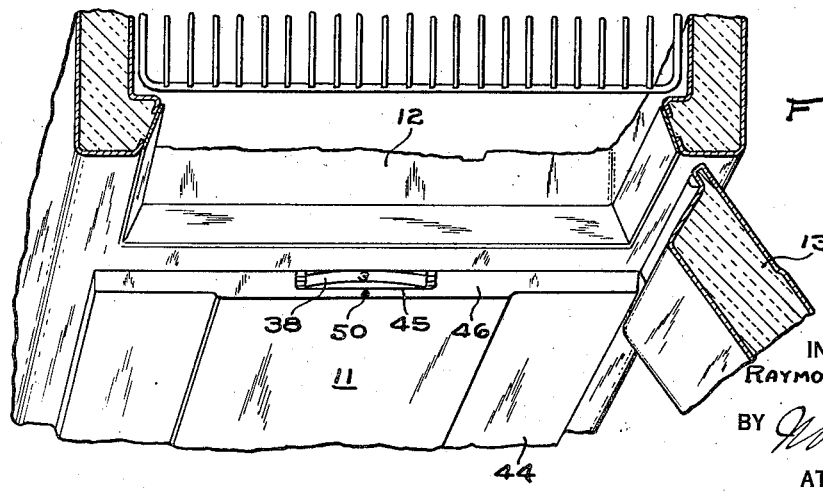
Fig. 2 is a perspective view of a portion of the domestic refrigerator cabinet shown in Fig. 1 and illustrates a preferred position of the temperature adjusting device.

Referring specifically to the drawings for a detailed description of my invention, numeral 11 designates generally a refrigerator cabinet, as shown in Figs. 1, 2 and 6, which cabinet embodies a heat insulated refrigerated food storage compartment 12, which is closed by an access door 13, and a machinery compartment 14 disposed below the refrigerated compartment 12. A compression type refrigerating system is shown in the drawings and comprises a motor 15 which drives a compressor 16, which compressor pumps high pressure refrigerant gas to a condenser 17, wherein the refrigerant gas is cooled by a fan 18 and condensed. Condensed refrigerant is then conveyed to an expansion device 19 and thence to an evaporator 21 disposed in the food storage compartment, and after abstracting heat therefrom, refrigerant gas is withdrawn by the compressor and the cycle repeated. The well known compressor - condenser - expander refrigeration cycle is used, as is apparent from the above description and further detailed explanation thereof is not necessary to a full understanding of the present invention.

In order to control the temperature of the evaporator 21, and thus the temperature of the food storage compartment 12, a control mechanism, generally indicated at 22 is provided, and, as shown in Figs. 5 and 6, comprises a bulb 23 filled with an expansible medium disposed in contact with the outer surface of the evaporator 21 and connected by a small conduit 24 with an expansible bellows 25. The bulb 23, therefore, quickly responds to evaporator temperature as well as to the temperature of the air adjacent the evaporator so that the expansible medium therein will expand quickly when warm ice trays (not shown) are disposed in the evaporator 21 or when the heat load within the storage compartment 12 reaches a predetermined value. The bellows 25 is connected to a pivoted lever 26 and upward movement thereof is opposed by a spring 27. A snap-acting switch mechanism 28 is attached to the free end of the lever 26, and operates a movable contact 29 which cooperates with a stationary contact 31 to open and close the motor circuit through conductors 32, 33, a suitable source of electric power being provided through conductors 34, as shown in Fig. 6. The entire control mechanism is preferably housed in a metal box 35, through which the conductors 32, 33, and 34 extend. The compressor will, therefore, be rendered active and inactive in accordance with the temperature and pressure of the expansible media in the bulb 23, so that, for constant ambient temperature, a substantially constant mean temperature will be maintained at any given point in the food storage compartment 12.

As stated hereinbefore, it is desirable to provide an adjustment for the temperature control mechanism so that fast ice freezing may be effected and so that desired temperatures in the storage compartment 12 may be obtained for different ambient temperatures, the ambient temperature normally varying from 60° to 110° F. depending on where the refrigerator is placed in the home, the season and the geographical location. A temperature adjusting device is, therefore, provided and comprises a shaft 36 threaded into the metal control box 35 and provided with a cap 37 at its inner end which engages the spring 27. The shaft is also provided with a readily accessible adjusting knob 38 at its outer end, more fully described hereinafter. The rotation of the shaft 36 in a clockwise direction increases the spring bias so that the temperature at the evaporator must be high to close the contacts 29, 31. The rotation of the shaft 36 in a counterclockwise direction decreases the spring bias so that the temperature at the evaporator must be lower to close the contacts 29, 31. A lever 39 is pivoted at 41 to the box 35 and a connecting link 42 is provided between lever 39 and lever 26. When the shaft 36 is turned sufficiently in a counterclockwise direction, the cap 37 engages the end of the lever 39 and moves it in a counterclockwise direction about the pivot 41, thus lowering the main lever 26 and maintaining the contacts 29, 31 in the open position so that the compressor 16 is inactive regardless of the temperature of the storage compartment 12 and evaporator 21.

In practicing my invention, a thermometer 43 which registers ambient temperatures is preferably disposed as an integral part of the door 13, as shown in Figs. 1 and 4. The thermometer 43 may be provided with the usual temperature indicia in degrees Fahrenheit and is also preferably divided into zones A, B, and C, as shown in Fig. 4. Zone A includes, by way of example, temperatures between 95° F. and 110° F. Zone B includes temperatures between 80° F. and 95° F. and zone C includes temperatures between 65° F. and 80° F.

The adjusting knob 38 is preferably a disk of considerable size and is disposed in the machinery compartment 14. An opening 45 is provided in the top ledge 46 of a panel 44 disposed below the door 13 through which a portion of the adjusting knob 38 is visible and adjustable. The structural features of this cabinet and control ensemble are completely disclosed and claimed in the copending application of W. B. Anderson, filed May 28, 1937, Serial No. 145,175 for Refrigeration apparatus and further description thereof is not believed to be necessary.

As shown in Fig. 3, one side of the ledge 46 adjacent the opening 45 for the adjusting knob is provided with the term "Room temperature" and with the letters A, B, and C, one above the other, corresponding to the letters A, B, and C which mark the aforesaid temperature zones on the thermometer 43. The adjusting knob 38 is provided with several indicia, such as an "Off" position (not shown in the diagrammatic control in Fig. 5), a "Defrost" position, a "Coldest" position and the intermediate positions numbered "2", "3", "4", and "5".

The "Defrost" position effects defrosting of the evaporator 21 by cycling the compressor at such a rate that the mean temperature of the evaporator will be above 32° F. and frost will, therefore, melt off. The "Off" position is the position described wherein the contacts 29, 31 are kept open regardless of evaporator or storage compartment temperatures.

Beside each of the numbers "2" to "5" on the adjusting knob 38, a vertical series of numerals are disposed, as clearly shown in Fig. 3. For example, the numerals "45", "41", "37", are disposed beside the number "4" with the numeral "45" at the top on a line with the letter A on the ledge 46, the numeral "41" next on a line with the letter B and the numeral "37" at the bottom on a line with the letter C. The numerals ranging from "33" to "48" represent storage compartment temperatures in degrees Fahrenheit, and when any particular series of numbers is disposed opposite a pointer 50 on the ledge 46, one of those temperatures will be maintained in the storage compartment 12 depending on ambient temperatures, since the control mechanism 22 has been calibrated to maintain approximately that temperature.

*Operation*

Assume, for example, that the ambient temperature surrounding the cabinet 11 is 88° F., as shown in Fig. 4, and that the operator desires to maintain the food storage compartment 12 at a mean temperature of 41° F. A reading of the thermometer 43 indicates that the ambient temperature is within the zone marked B. The operator then chooses the middle row of figures on the adjusting knob 38 opposite the letter B on the ledge 46. The adjusting knob is then turned until the numeral "41" of the middle row of figures appears opposite the pointer 50, which is the number "4" position. The food storage compartment is then maintained at a mean temperature of approximately 41° F.

Suppose now that the ambient temperature rises to 100° F. and it is still desired to maintain substantially the same mean temperature in the storage compartment 12. The thermometer 43 will now read in the A zone, so that the figures opposite the letter A on the ledge 46 are the proper ones to select. The operator turns the adjusting knob 38 until the numeral "40" on the A line is opposite the pointer, which happens to be the number "2" position.

It will be seen, therefore, that the temperature which the operator desires in the food storage compartment may be quickly and positively obtained for all normal ambient conditions and within the range of the control mechanism and the capacity of the machine. Although I have shown my invention applied to one type of domestic refrigerator, it will be obvious that it is not limited either to compression type refrigerating apparatus or to domestic refrigerators.

While I have shown my invention in but one form, it will be obvious to those skilled in the art that it is not so limited, but is susceptible of various changes and modifications without departing from the spirit thereof; and I desire, therefore, that only such limitations shall be placed thereupon as are imposed by the prior art or as are specifically set forth in the appended claims.

What I claim is:

1. The method of adjusting refrigerating apparatus including a machine for refrigerating a zone at substantially constant mean selected temperatures, said apparatus also including a device for indicating the temperature of the ambient media exteriorly of said zone, said temperature indicating device being provided with indicia thereon, said apparatus also including a mechanism for controlling the operation of the machine in accordance with a temperature condition within said zone, and said controlling mechanism being provided with an adjusting device having associated therewith a first series of indicia correlated with the indicia on said temperature indicating device and a second series of indicia associated with said adjusting device comprising a scale of temperatures corresponding to the temperatures to be selected of the zone to be refrigerated, which method includes observing the indicia recorded by said temperature indicating device and adjusting said adjusting device to the temperature desired to be maintained in said zone by using the indicia recorded on said temperature indicating device and the first of said indicia associated with said adjusting device as a guide in selecting the proper setting of said adjusting device to maintain a desired temperature in the zone to be refrigerated as indicated by the second of said indicia associated with said adjusting device.

2. The method of controlling the operation of refrigerating apparatus including a heat insulated storage compartment and a machine for extracting heat from said insulated storage compartment, which refrigerating apparatus also includes means for controlling the temperature of said storage compartment, said controlling means having an adjusting device for varying the temperature of said storage compartment, and a temperature-indicating device which is marked with indicia thereon and registers ambient temperature adjacent said storage compartment, said adjusting device having a first set of indicia associated therewith correlated with the indicia on said temperature-indicating device and a second set of indicia associated therewith indicating the position of the adjusting device for obtaining desired temperatures in the storage compartment for different ambient conditions, which method comprises reading the temperature-indicating device and then setting said adjusting device to the desired storage compartment temperature after comparing the reading of said temperature indicator and the first set of indicia associated with said controlling device to determine which of said second set of indicia associated with said adjusting device should be used as the correct position thereof to obtain the desired storage compartment temperature.

3. The method of adjusting refrigerating apparatus including a machine for refrigerating a zone at substantially constant temperature, said apparatus also including a device for indicating the temperature of the ambient media exteriorly of said zone, which device is provided with indicia thereon, a mechanism for controlling the operation of the refrigerating machine in accordance with the temperature within said zone and an adjusting device for the controlling mechanism provided with a series of indicia corresponding to the indicia on said temperature indicating device, each of said series of indicia including a scale of temperatures, which method includes observing the index recorded by the temperature indicating device and adjusting said controlling mechanism to the temperature desired to be maintained using the index recorded by said temperature indicating device as a guide for selecting a scale of temperatures on said adjusting device.

4. The method of controlling the operation of a refrigerating machine having a refrigerated storage compartment and an adjustable mechanism calibrated with a series of temperature indications for various ambient conditions for controlling the temperature of said storage compartment, which method comprises evaluating the temperature of the air outside said storage compartment and regulating the operation with said refrigerating machine by choosing the desired temperature indication of the adjustable mechanism in accordance with said temperature evaluation.

5. The method of controlling the operation of refrigerating apparatus embodying a refrigerating machine, an insulated storage compartment refrigerated by said machine and an adjustable mechanism calibrated with a series of temperature indications for various ambient conditions for controlling the operation of said refrigerating machine, which method comprises evaluating the temperature of the air outside said storage compartment and adjusting said control mechanism by choosing the desired temperature indication thereof in accordance with said temperature evaluation.

RAYMOND C. COSGROVE.